United States Patent
Wang et al.

(10) Patent No.: US 11,847,669 B2
(45) Date of Patent: Dec. 19, 2023

(54) SYSTEMS AND METHODS FOR KEYWORD CATEGORIZATION

(71) Applicant: Walmart Apollo, LLC, Bentonville, AR (US)

(72) Inventors: Zigeng Wang, Coventry, CT (US); Cheng Jie, Sunnyvale, CA (US); Wei Shen, Pleasanton, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 98 days.

(21) Appl. No.: 16/777,055

(22) Filed: Jan. 30, 2020

(65) Prior Publication Data

US 2021/0241313 A1    Aug. 5, 2021

(51) Int. Cl.
| | |
|---|---|
| *G06Q 30/0241* | (2023.01) |
| *G06Q 30/0273* | (2023.01) |
| *G06Q 30/0251* | (2023.01) |
| *G06F 16/901* | (2019.01) |
| *G06F 16/906* | (2019.01) |
| *G06F 16/903* | (2019.01) |

(52) U.S. Cl.
CPC ....... *G06Q 30/0247* (2013.01); *G06F 16/906* (2019.01); *G06F 16/9024* (2019.01); *G06F 16/90344* (2019.01); *G06Q 30/0256* (2013.01); *G06Q 30/0275* (2013.01)

(58) Field of Classification Search
None
See application file for complete search history.

(56) References Cited

U.S. PATENT DOCUMENTS

| | | | |
|---|---|---|---|
| 8,922,559 B2 | 12/2014 | Charles et al. | |
| 2006/0206479 A1* | 9/2006 | Mason | G06Q 30/02 |
| 2008/0140707 A1 | 6/2008 | Lang et al. | |
| 2008/0256034 A1 | 10/2008 | Chang et al. | |
| 2014/0025480 A1* | 1/2014 | Carter | G06Q 30/0246 |
| | | | 705/14.43 |
| 2014/0156420 A1 | 6/2014 | Chow et al. | |
| 2017/0323018 A1* | 11/2017 | Angelova | G06Q 30/0277 |
| 2018/0329985 A1* | 11/2018 | Bao | G06F 16/3334 |
| 2018/0365253 A1* | 12/2018 | Francis | G06F 16/9535 |

OTHER PUBLICATIONS

Huang, Luling: Measuring Similarity Between Texts in Python, available at https://sites.temple.edu/tudsc/2017/03/30/measuring-similarity-between-texts-in-python/ (Year: 2017).*

* cited by examiner

*Primary Examiner* — Katherine Kolosowski-Gager
(74) *Attorney, Agent, or Firm* — BRYAN CAVE LEIGHTON PAISNER LLP

(57) ABSTRACT

Systems and methods including one or more processors and one or more non-transitory storage devices storing computing instructions configured to run on the one or more processors and perform determining a respective interaction metric between at least two respective keywords of a plurality of keywords; constructing, using each respective interaction metric, as determined, a graph comprising a plurality of nodes connected by at least one edge; identifying one or more clusters of nodes using the graph; optimizing each cluster of nodes of the one or more clusters of nodes; and facilitating altering a graphical user interface (GUI) of an electronic device based upon a cluster of nodes of the one or more clusters of nodes, as identified and optimized. Other embodiments are disclosed herein.

20 Claims, 6 Drawing Sheets

SYSTEMS AND METHODS FOR KEYWORD CATEGORIZATION

TECHNICAL FIELD

This disclosure relates generally to data structures, and more particularly to systems and methods for creating organized data structures for keywords.

BACKGROUND

The use and value of keywords and keyword sets in modern computer systems cannot be overstated. For example, keywords and keyword sequences are integral to the operation of search algorithms, the training of machine learning algorithms, and/or the operation of automated search engine marketing systems. Keywords and keyword sequences, though, are seen as nothing but blocks of text by conventional computer systems without some type of organization giving context to the keyword or keyword sequences. Therefore, clustering (or re-clustering) keywords and/or sequences of keywords presents a technical problem integral to the operation of modern computer systems.

In the past, many keywords and/or keyword sequences have been categorized using data obtained from the operation of search engines. In these prior art systems, keywords and/or keyword sequences are classified based on relevant results returned by the search engine. This, though, results in many keywords and/or keyword sets being classified in incorrect ways. For example keywords of "water fountains outdoor" has been matched to the keyword sequences of "+outdoor+water+fountains" and "+water+outdoor+fountains" by prior art systems. In this example, the intent of the keywords was to identify fountains, but the first two classifications of the keywords are water and outdoor. This classification, in turn, can cause problems downstream when these keywords are used in various frameworks. To continue with the example above, if these classifications were used to bid on search engine advertisements, a cost and number of clicks of each text ad can potentially be affected by other ads with a similar classification (e.g., bottles of water, outdoor furniture, etc.), thereby making the behavior of a given text advertisement unpredictable. If these classifications were used as machine learning labels for the keywords, then any resulting machine learning model trained on the labels could be inaccurate (e.g., by determining that the keywords are most likely related to outdoor items and/or water items instead of fountains). If these classifications of were used to return results of a query comprising the keywords, then inaccurate and/or irrelevant results (e.g., by returning bottles of water or outdoor furniture). Therefore, due to a myriad of downstream uses, there is a need for a more accurate classification system for keywords.

BRIEF DESCRIPTION OF THE DRAWINGS

To facilitate further description of the embodiments, the following drawings are provided in which.

Figure 1:
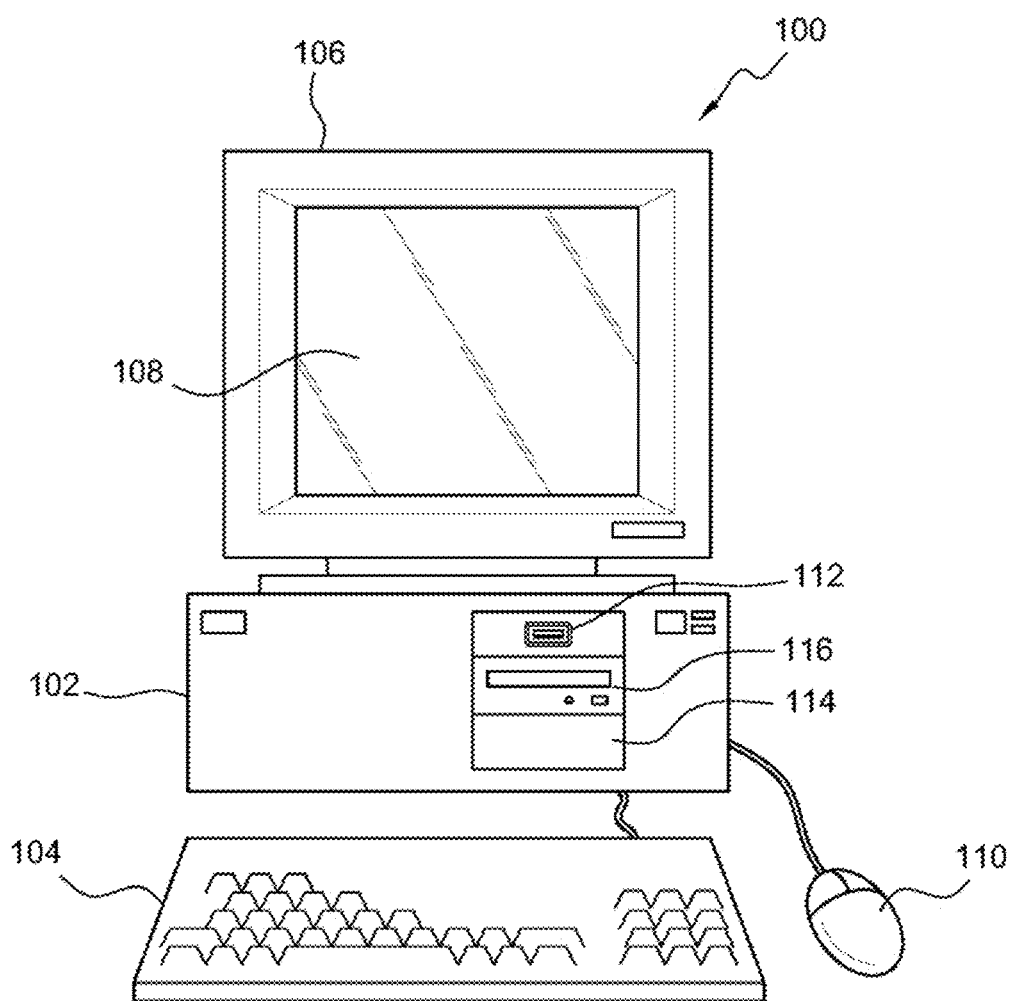
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform determining a respective interaction metric between at least two respective keywords of a plurality of keywords; constructing, using each respective interaction metric, as determined, a graph comprising a plurality of nodes connected by at least one edge; identifying one or more clusters of nodes using the graph; optimizing each cluster of nodes of the one or more clusters of nodes; and facilitating altering a graphical user interface (GUI) of an electronic device based upon a cluster of nodes of the one or more clusters of nodes, as identified and optimized.

Various embodiments include a method. The method can be implemented via execution of computing instructions configured to run at one or more processors and configured to be stored at non-transitory computer-readable media The method can comprise determining a respective interaction metric between at least two respective keywords of a plurality of keywords; constructing, using each respective interaction metric, as determined, a graph comprising a plurality of nodes connected by at least one edge; identifying one or more clusters of nodes using the graph; optimizing each cluster of nodes of the one or more clusters of nodes; and facilitating altering a graphical user interface (GUI) of an electronic device based upon a cluster of nodes of the one or more clusters of nodes, as identified and optimized.

Figure 2:
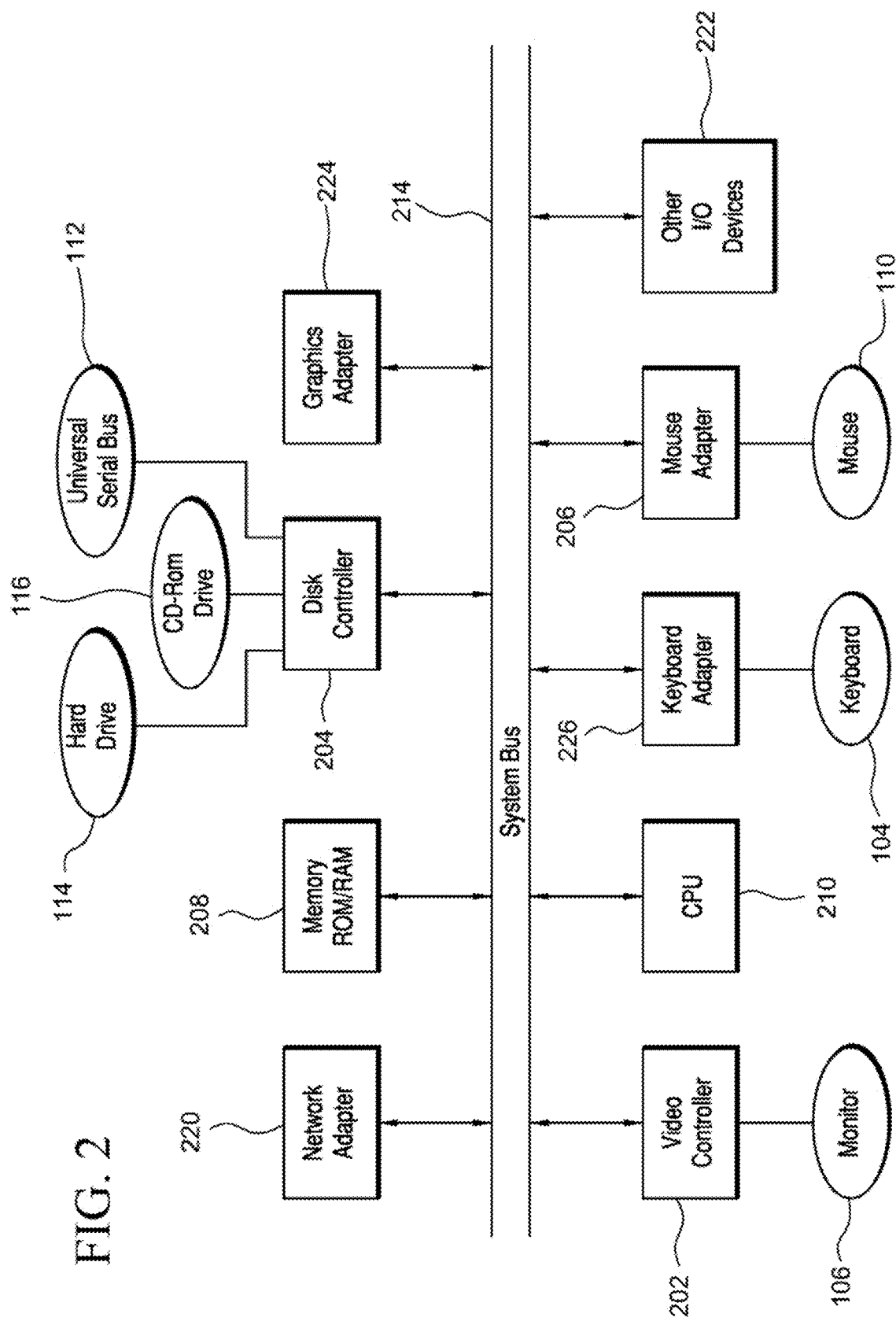
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
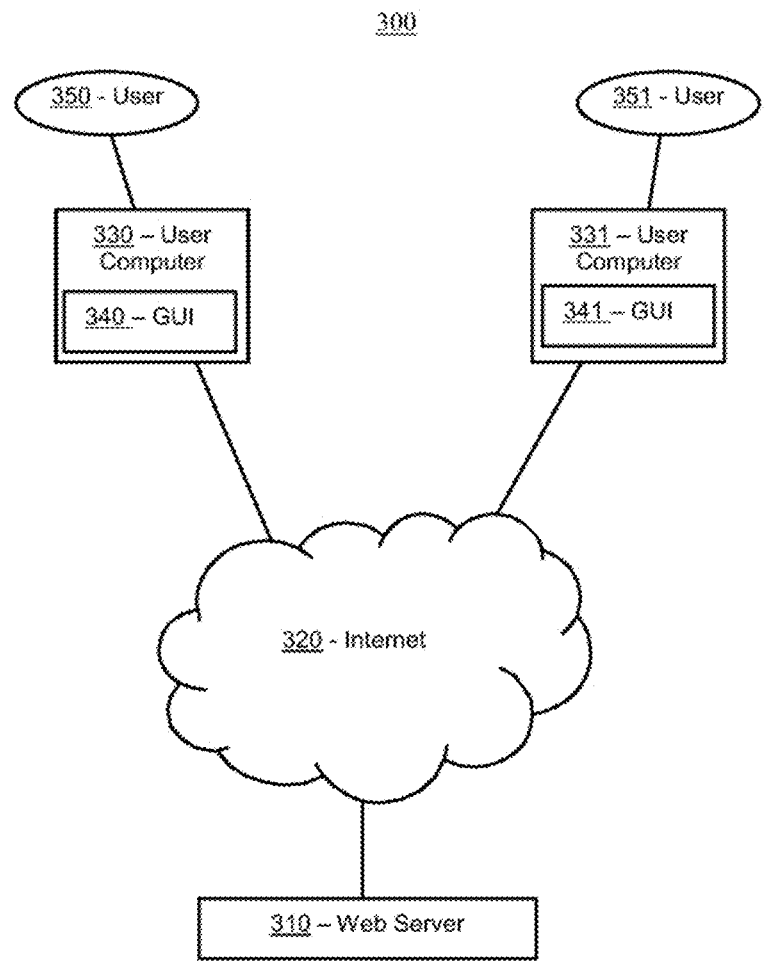
FIG. 3 illustrates a representative block diagram of a system, according to an embodiment.

Turning ahead in the drawings, FIG. 3 illustrates a block diagram of a system 300 that can be employed for keyword categorization, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310. Web server 310 each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310. Additional details regarding web server 310 are described herein.

In many embodiments, system 300 also can comprise user computers 330, 331. In other embodiments, user computers 330, 331 are external to system 300. User computers 330, 331 can comprise any of the elements described in relation to computer system 100. In some embodiments, user computers 330, 331 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300 can comprise graphical user interface ("GUI") 340, 341. In the same or different embodiments, GUI 340, 341 can be part of and/or displayed by user computers 330, 331, which also can be part of system 300. In some embodiments, GUI 340, 341 can comprise text and/or graphics (image) based user interfaces. In the same or different embodiments, GUI 340, 341 can comprise a heads up display ("HUD"). When GUI 340, 341 comprises a HUD, GUI 340, 341 can be projected onto glass or plastic, displayed in midair as a hologram, or displayed on monitor 106 (FIG. 1). In various embodiments, GUI 340, 341 can be color or black and white. In many embodiments, GUI 340, 341 can comprise an application running on a computer system, such as computer system 100, user computers 340, 341, and/or web server computer 310. In the same or different embodiments, GUI 340, 341 can comprise a website accessed through internet 320. In some embodiments, GUI 340, 341 can comprise an eCommerce website. In the same or different embodiments, GUI 340, 341 can be displayed as or on a virtual reality (VR) and/or augmented reality (AR) system or display. In many embodiments, an interaction with a GUI can be received by system 300. In some embodiments, an interaction with a GUI can comprise a click, a look, a selection, a grab, a view, a purchase, a bid, a pinch, a reverse pinch, a swipe, etc.

In some embodiments, web server 320 can be in data communication through Internet 320 with user computers (e.g., 330, 331). In certain embodiments, user computers 330, 331 can be desktop computers, laptop computers, smart phones, tablet devices, and/or other endpoint devices. Web server 310 can host one or more websites. For example, web server 310 can host an eCommerce web site that allows users to browse and/or search for products, to add products to an electronic shopping cart, and/or to purchase products, in addition to other suitable activities.

In many embodiments, web server 310 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) web server 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310. In a similar manner, the processing module(s) and the memory storage module(s) can be local and/or remote to each other.

In many embodiments, web server 310 can be configured to communicate with one or more user computers 330 and 331. In some embodiments, user computers 330 and 331 also can be referred to as customer computers. In some embodiments, web server 310 can communicate or interface (e.g., interact) with one or more customer computers (such as user computers 330 and 331) through a network or internet 330. Internet 330 can be an intranet that is not open to the public. (The intranet can be part of system 300.) Accordingly, in many embodiments, web server 310 (and/or the software used by such systems) can refer to a back end of system 300 operated by an operator and/or administrator of system 300, and user computers 330 and 331 (and/or the software used by such systems) can refer to a front end of system 300 used by one or more users 350, 351, respectively. In some embodiments, users 350, 351 can also be referred to as customers, in which case, user computers 330, 331 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 310, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for a better classified corpus of keywords to use for many downstream applications (e.g., to build a better search algorithm, to train a more accurate machine learning algorithm, to more accurately bid on keyword advertisements, etc.). These techniques described herein can provide a significant improvement over conventional approaches of keyword classification, such as using search results, as described above.

In many embodiments, the techniques described herein can be used continuously at a scale that cannot be reasonably performed using manual techniques or the human mind. For example, the datasets used in the machine learning algorithms described below can be too large to be analyzed using manual techniques.

In a number of embodiments, the techniques described herein can solve a technical problem that arises only within the realm of computer networks, as search engines, machine learning algorithms, and search engine marketing, do not exist outside the realm of computer networks.

Figure 4:
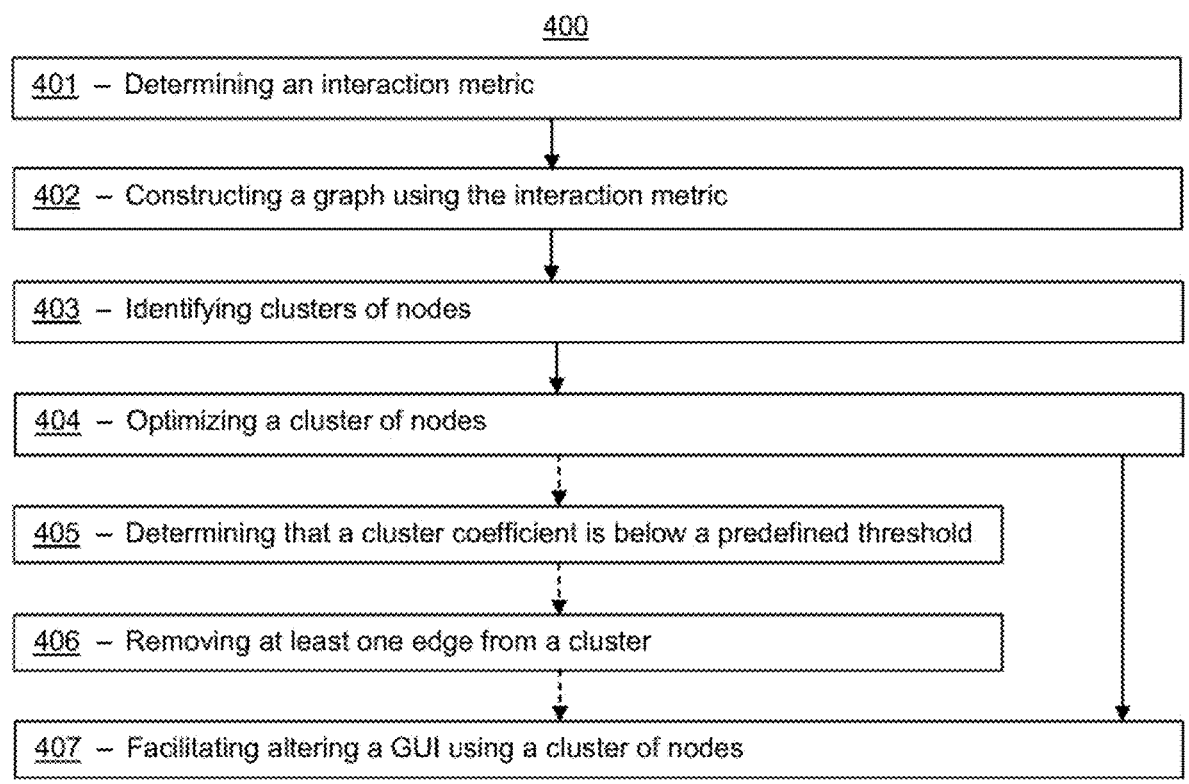
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310 (FIG. 3). The processing module(s) can be similar or identical to the processing module(s) described above with respect to computer system 100 (FIG. 1).

In many embodiments, method 400 can comprise an activity 401 of determining an interaction metric. In some embodiments, an interaction metric can be determined between a keyword and a sequence of keywords, two keywords, and/or two keyword sequences. In many embodiments, a keyword and/or a keyword sequence can be received from a graphical user interface of an electronic device of a user and stored in a database. In various embodiments, keywords can be created by harvesting keywords from search queries that resulted in one or more interactions with a GUI. In some embodiments, an unordered grouping of keywords can be referred to as a keyword set. In these or other embodiments, an ordered keyword set can be referred to as a keyword sequence. In some embodiments, a keyword sequence can be ordered by a probability of association with one or more other keywords, a number of interactions with those one or more other keywords, and/or an amount of revenue or profit generated by the keyword sequence. In other embodiments, the keyword sequence can be ordered by a third party (e.g., a search engine marketing entity). In various embodiments, using keyword sequences can allow a system to categorize ranked sets of keywords thereby yielding more information about interconnections between the keywords. In some embodiments, practicing embodiments of the invention using keyword sets and/or keyword sequences can allow one to categorize keywords as a group, thereby avoiding problems associated with too little interaction data or noise associated with one or more keywords in the set and/or sequence. In various embodiments, a graphical user interface can comprise GUI 340, 341 (FIG. 3). In the same or different embodiments, one or more keywords can be purchased from a third party vendor, generated from search queries, and/or generated from machine learning labels.

In many embodiments, determining an interaction metric can be performed using a set of rules. In various embodiments, an interaction can comprise an interaction with a GUI, as described with reference to FIG. 3. In these or other embodiments, a set of rules can operate as a function of a number of interactions between keywords, keyword sets, and/or keyword sequences. In some embodiments, an interaction metric can be determined for only keywords having a number of interactions above a predetermined threshold. In these or other embodiments, the predetermined threshold can be set by an administrator of system 300 (FIG. 3). In various embodiments, an interaction metric can be determined using interactions received over a period of time (e.g., day(s), month(s), year(s), etc.). In many embodiments, a period of time can be rolling and/or interactions can continually be stored in a database. In some embodiments, interactions can be deleted from a database when they become older than a maximum age. In many embodiments, a maximum age can be determined by an administrator of system 300 (FIG. 3). In various embodiments, interactions can be associated with a user. In these or other embodiments, interactions associated with a user can be used practice embodiments of the invention that are customized and/or tailored to the user.

It should be understood that, while the embodiment below describes determining an interaction metric between two keyword sequences, an interaction metric can also be determined between (1) a keyword and a sequence of keywords, (2) two keywords, (3) two keyword sequences (4) a keyword and a keyword set, (5) two keywords sets, (6) and/or a keyword set and a keyword sequence, among other pairs. In many embodiments, an interaction metric can be determined using two keyword sequences, t1 and t2. In some embodiments, t1 and t2 can have shared keywords s1 and s2. In these or other embodiments, a total number of interactions of s1 and s2 related to t1 can comprise sc1. In many embodiments, a total number of interactions of s1 and s2 related to t2 can comprise sc2. In these or other embodiments, a total number of interactions for t1 can comprise c1. In various embodiments, a total number of interactions for t2 can comprise c2. In many embodiments, an interaction metric between t1 and t2 can be determined using an expression comprising $$\frac{\sqrt{sc1}}{\sqrt{c1}} * \frac{\sqrt{sc2}}{\sqrt{c2}}.$$

In many embodiments, an interaction metric can be determined over a specified time period (e.g., days, weeks, moths, years, etc.).

Figure 6:
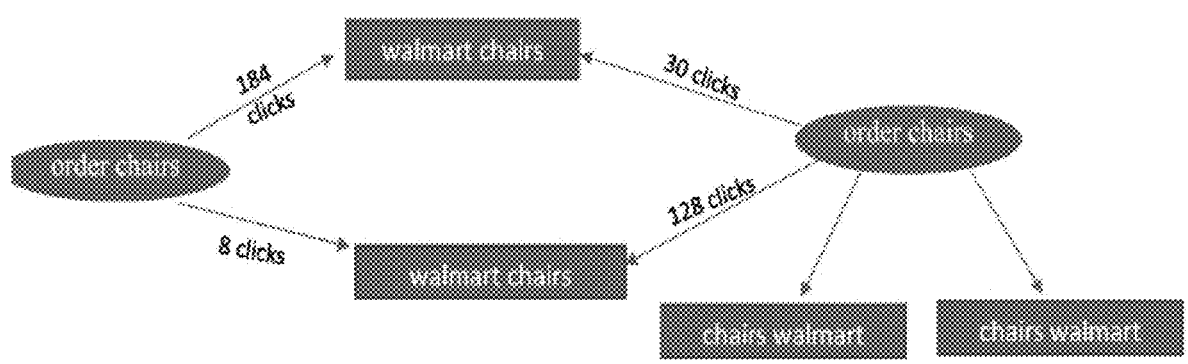
FIG. 6 illustrates an exemplary graph, according to an additional embodiment.

For example, as illustrated in FIG. 6, during the month of April, the keyword set of "Order Chairs" have a total of 192 interactions. Among the 192 interactions, 184 of them are linked to a keyword sequence of "walmart chairs", and 8 of them are linked a keyword sequence of "chairs walmart". During the same period, keyword set of "chairs walmart" have 172 interactions. Among the 172 interactions, 30 interactions are linked to the keyword sequence "walmart chairs", 128 clicks are linked to the keyword sequence "chairs walmart", and 14 clicks are matched to other keyword sequences of "chair walmart" (11 clicks) and "walmart chair" (3 clicks). As a result, an interaction metric of the two keyword sets can be computed as $$\frac{\sqrt{192}}{\sqrt{192}} * \frac{\sqrt{158}}{\sqrt{172}} = 0.958.$$

In many embodiments, method 400 can comprise an activity 402 of constructing a graph using the interaction metric. In various embodiments, a graph can comprise a graph matrix. In many embodiments, a graph can comprise a network graph. An exemplary graph is shown in FIG. 6, which was described above with reference to activity 401. In some embodiments, creating a graph in activity 402 can comprise creating a plurality of nodes and at least one edge. In various embodiments, a node can represent a keyword, a keyword set, and/or a keyword sequence. In some embodiments, an edge can extend between and/or connect two nodes. In these or other embodiments, an edge can represent and/or be valued at a respective number of user interactions for one or more shared keywords between nodes it connects. In some embodiments, an original node can be connected by more than one edge to more than one other node when the original node has more than one shared keyword represented by the other nodes, where each edge of the more than one edge is connected to a different one of the other nodes. In these or other embodiments, a graph can first be populated with a corpus of keywords represented as nodes, and then keywords with no interaction metric, interaction metrics below a predetermined threshold, or negative interaction metrics can have their nodes removed from the graph.

Returning now to FIG. 4, in many embodiments, method 400 can further comprise an activity 403 of identifying clusters of nodes. In various embodiments, a cluster of nodes can comprise at least two nodes connected by at least one edge. In some embodiments, clusters of nodes can be identified using a graph, as constructed in activity 402. In these or other embodiments, a cluster of nodes can comprise nodes representing keywords with an interaction metric above a predetermined threshold. In some embodiments, the predetermined threshold can be set by an administrator of system 300 (FIG. 3). In many embodiments, clusters of nodes can be identified using a union find algorithm on a graph. In some embodiments, the union find algorithm can use the predetermined threshold to identify clusters of nodes. As an example, a union find algorithm can be configured to find one or more clusters in an graph. In many embodiments, a union find algorithm can denote each individual keyword as a single set, and then traverse a graph to union the sets. After a first iteration of graph traversing and union, the same process can be repeated. In some embodiments, graph traversing and union can repeat until no nodes can be found after traversing the graph.

In many embodiments, new keywords can be received at system 300 (FIG. 3). In some embodiments a new keyword can be one or more keywords having no interaction data or an amount of interaction data below a predetermined threshold. In the same or different embodiments, a predetermined threshold can comprise a predetermined number of interactions. In many embodiments, the number of interactions can be time bound (e.g., occurring over a predetermined period of time or on a rolling basis). In these or other embodiments, a new keyword can have a node generated and then connected via an edge to an existing node and/or a cluster of nodes. In various embodiments, a node representing a new keyword can be attached to an existing node and/or a cluster of nodes based upon a similarity of the new keyword and one or more keywords in the existing node and/or the cluster of nodes. In some embodiments, a node representing a new keyword can be exempt from activities 404-406 as described below.

In many embodiments, a similarity can be determined between a new keyword and one or more keywords by vectorizing a keyword and the one or more keywords. In some embodiments, vectorizing can comprise converting text to a vector representation of that text (e.g., creating an embedding from the text). In these or other embodiments, a sentence or text embedding algorithm can be used to vectorize a keyword. In various embodiments, vector representations of individual keywords in a set, sequence, or cluster can be combined to create a vector representation of the set or sequence. In many embodiments, a vector representation of a keyword set, a keyword sequence, or a cluster can comprise a weighted average of each vector representation within the set, sequence, or cluster. In some embodiments, a similarity between two or more vectorized keywords can be determined by calculating a cosine similarity between the two or more vectorized keywords. In some embodiments, a node representing a new keyword can be connected a node representing one or more keywords or a cluster of nodes having a smallest cosine similarity in a graph.

In many embodiments, method 400 can comprise an activity 404 of optimizing a cluster of nodes. In some embodiments, optimizing a cluster of nodes can result in more refined clusters with stronger connections. In these or other embodiments, optimizing a cluster of nodes can comprise removing at least one edge thereby creating at least two more strongly related clusters. In various embodiments, optimizing a cluster of does can comprise increasing or maximizing a density of the cluster.

In some embodiments, method 400 can optionally comprise activity 405 of determining that a cluster coefficient is below a predetermined threshold. In various embodiments, activity 405 can be performed after or as a part of activity 404. In some embodiments, a cluster coefficient can be a measurement of the strength, relatedness, and/or density of a cluster. In many embodiments, a cluster coefficient can be determined using a second set of rules. In these or other embodiments, a second set of rules can operate as a function of a number of all triples in a cluster and a number of closed triplets in a cluster. In various embodiments, a triplet can comprise a grouping of three nodes connected by at least two edges. In many embodiments, a closed triplet can comprise a grouping of three nodes connected to each other by three edges or in a closed shape (e.g., a triangle). In these or other embodiments, a cluster coefficient can be calculated by dividing a number of closed triplets in a cluster by a number of all triplets in the cluster. In some embodiments, a predetermined threshold for a cluster coefficient can be set by an administrator of system 300 (FIG. 3).

In some embodiments, method 400 can optionally comprise an activity 406 of removing at least one edge from the cluster. In various embodiments, activity 406 can be performed after or as a part of activities 404 and/or 405. In there or other embodiments, an edge can be removed by identifying all nodes at a center of an open triplet, and breaking one or more edges of a node at a center of an open triplet. In some embodiments, and open triplet can comprise a grouping of three nodes connected by two edges. In various embodiments, a node at a center of an open triplet can comprise a node of the three nodes being connected to both other nodes of the three nodes. In these or other embodiments, breaking one or more edges of a node at a center of an open triplet can comprise choosing which edge of two or more edges of the open triplet to break. In many embodiments, an edge can be chosen by removing an each edge of the two or more edges. A clustering coefficient can then be determined for each cluster of the two resulting clusters. In embodiments where the clustering coefficients are both above a predetermined threshold, the removal of the edge can be made permanent. In embodiments where one or more of the clustering coefficients is below the predetermined threshold, the edge can be reestablished.

In many embodiments, after activity 404 (and possibly after activity 405 and 406), method 400 can comprise an activity 407 of facilitating altering a GUI using a cluster of nodes. In some embodiments, an alteration of a GUI can comprise a display of an advertisement, a return of search results, a change in GUI layout, etc. based upon a cluster of nodes of the one or more clusters of nodes. For example, clusters of nodes as described in activities 403-406 can be used in activity 407. In many embodiments, a cluster of nodes can be used in a revenue per click (RPC) prediction for an automated search engine marketing bidding system. In various embodiments, RPC can be determined for a cluster using data from the items represented by nodes in the cluster. In these or other embodiments, features shared by one or more nodes in a cluster can be extracted from a cluster of nodes, and the features can be used to make predictions. In various embodiments, a gradient boosting model can use features extracted from nodes to predict a RPC. In many embodiments, features of a cluster can comprise historical RPC, historical order size, historical revenue per order, historical conversion rate, and/or a recent item price.

Figure 5:
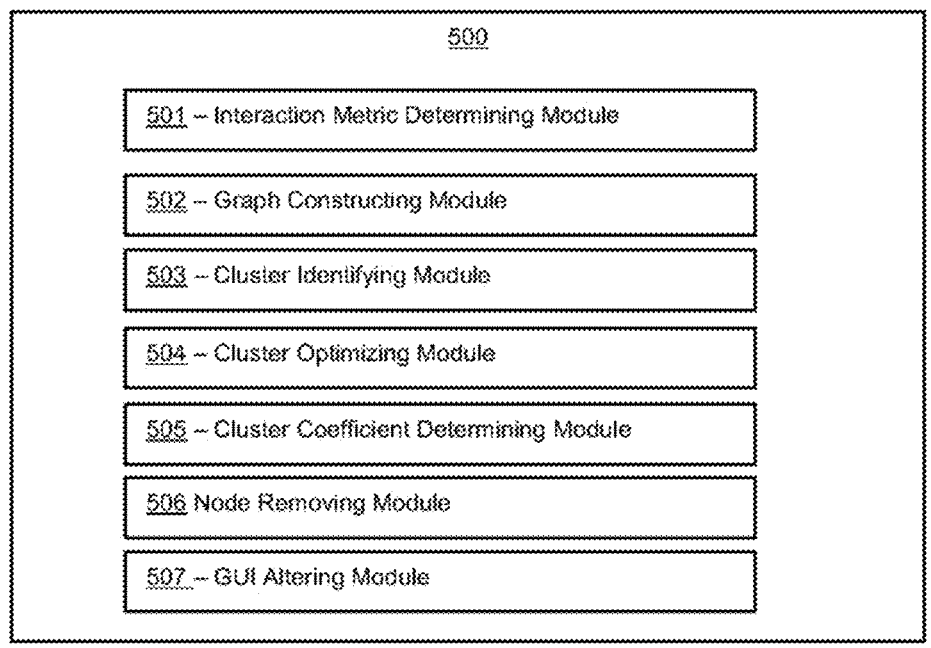
FIG. 5 illustrates a representative block diagram of a system, according to an additional embodiment.

Turning ahead in the drawings, FIG. 5 illustrates a block diagram of a system 500 that can be employed for keyword categorization. System 500 is merely exemplary and embodiments of the system are not limited to the embodiments presented herein. System 500 can be employed in many different embodiments or examples not specifically depicted or described herein. In some embodiments, certain elements or modules of system 500 can perform various procedures, processes, and/or activities. In these or other embodiments, the procedures, processes, and/or activities can be performed by other suitable elements or modules of system 500.

Generally, therefore, system 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein.

In many embodiments, system 500 can comprise non-transitory memory storage module 501. Memory storage module 501 can be referred to as interaction metric determining module 501. In many embodiments, interaction metric determining module 501 can store computing instructions configured to run on one or more processing modules and perform one or more acts of method 400 (FIG. 4) (e.g., activity 401 (FIG. 4)).

In many embodiments, system 500 can comprise non-transitory memory storage module 502. Memory storage module 502 can be referred to as graph constructing module 502. In many embodiments, graph constructing module 502 can store computing instructions configured to run on one or more processing modules and perform one or more acts of method 400 (FIG. 4) (e.g., activity 402 (FIG. 4)).

In many embodiments, system 500 can comprise non-transitory memory storage module 503. Memory storage module 503 can be referred to as cluster identifying module 503. In many embodiments, cluster identifying module 503 can store computing instructions configured to run on one or more processing modules and perform one or more acts of method 400 (FIG. 4) (e.g., activity 403 (FIG. 4)).

In many embodiments, system 500 can comprise non-transitory memory storage module 504. Memory storage module 504 can be referred to as cluster optimizing module 504. In many embodiments, cluster optimizing module 504 can store computing instructions configured to run on one or more processing modules and perform one or more acts of method 400 (FIG. 4) (e.g., activity 404 (FIG. 4)).

In many embodiments, system 500 can comprise non-transitory memory storage module 505. Memory storage module 505 can be referred to as cluster coefficient determining module 505. In many embodiments, cluster coefficient determining module 505 can store computing instructions configured to run on one or more processing modules and perform one or more acts of method 400 (FIG. 4) (e.g., activity 405 (FIG. 4)).

In many embodiments, system 500 can comprise non-transitory memory storage module 506. Memory storage module 506 can be referred to as node removing module 506. In many embodiments, node removing module 506 can store computing instructions configured to run on one or more processing modules and perform one or more acts of method 400 (FIG. 4) (e.g., activity 406 (FIG. 4)).

In many embodiments, system 500 can comprise non-transitory memory storage module 507. Memory storage module 507 can be referred to as GUI altering module 507. In many embodiments, GUI altering module 507 can store computing instructions configured to run on one or more processing modules and perform one or more acts of method 400 (FIG. 4) (e.g., activity 407 (FIG. 4)).

Although systems and methods for keyword categorization have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that when, executed on the one or more processors, cause the one or more processors to perform operations comprising:
determining an ordered sequence of a group of keywords by using a probability of association of the group of keywords with a plurality of other keywords, wherein each ordered sequence of the group of keywords is linked to a number of respective interactions over a rolling predetermined time period, and wherein each of the respective interactions that exceeds a maximum age is deleted from a database;
determining a respective interaction metric for the ordered sequence of the group of keywords during the rolling predetermined time period;

constructing, using each respective interaction metric, as determined, a graph comprising a plurality of nodes connected by at least one edge, wherein each respective node of the plurality of nodes represents at least one respective keyword of the group of keywords;

identifying one or more clusters of nodes using the graph;

optimizing each cluster of nodes of the one or more clusters of nodes;

training a predictive algorithm on the one or more clusters of nodes, as identified and optimized; and facilitating altering a graphical user interface (GUI) of an electronic device using the predictive algorithm, as trained.

2. The system of claim 1, wherein determining the respective interaction metric comprises:

using a first set of rules that operate as a function of an expression comprising at least one square root and at least one fraction, wherein the at least one square root is in a numerator or a denominator of the fraction; and determining the respective interaction metric over a specified time period.

3. The system of claim 1, wherein:

determining the ordered sequence of the group of keywords comprises using a probability of association with an amount of revenue or profit generated by a keyword sequence, wherein the keyword sequence comprises the ordered sequence of the group of keywords;

determining the respective interaction metric comprises determining the respective interaction metric between two keyword sequences;

each respective edge of the at least one edge:
connects a respective pair of nodes; and
represents a respective number of user interactions between the respective pair of nodes connected by the respective edge; and the computing instructions, when executed on the one or more processors, further cause the one or more processors to perform an operation comprising:
harvesting one or more keywords from at least one or more search queries that resulted in one or more interactions with the GUI of the electronic device.

4. The system of claim 1, wherein the computing instructions, when executed on the one or more processors, further cause the one or more processors to perform operations comprising:

receiving at least one new keyword at the system; and for each respective new keyword of the at least one new keyword received at the system:
when the respective new keyword is similar to a respective keyword represented by a respective cluster of nodes of the one or more clusters of nodes, creating an edge between a respective node representing the respective new keyword and a node of the respective cluster of nodes of the one or more clusters of nodes.

5. The system of claim 4, wherein creating the edge between the respective node representing the respective new keyword and the node of the respective cluster of nodes of the one or more clusters of nodes comprises:

vectorizing the respective new keyword of the at least one new keyword and the respective keyword; and using a cosine similarity between the respective new keyword of the at least one new keyword, as vectorized, and the respective keyword, as vectorized, to determine when to create the edge between the respective node representing the respective new keyword and the node of the respective cluster of nodes of the one or more clusters of nodes.

6. The system of claim 1, wherein facilitating altering the GUI of the electronic device using the predictive algorithm, as trained, comprises:

predicting a revenue per click using the predictive algorithm, as trained; and determining a bid on at least one keyword represented by at least one node in the one or more clusters of nodes using the revenue per click, as predicted.

7. The system of claim 1, wherein:

identifying the one or more clusters of nodes further comprises using a union find algorithm on the graph; and each respective node pair connected by a respective edge in the one or more clusters of nodes represents a respective pair of keywords having their respective interaction metric above a predetermined threshold.

8. The system of claim 1, wherein optimizing each cluster of nodes of the one or more clusters of nodes comprises:

determining that a cluster coefficient of a cluster of nodes of the one or more clusters of nodes is below a predetermined threshold; and after determining that the cluster coefficient of the cluster of nodes of the one or more clusters of nodes is below the predetermined threshold, removing at least one edge of the cluster of nodes from the one or more clusters of nodes.

9. The system of claim 8, wherein the cluster coefficient of the cluster of nodes is determined using a set of cluster rules that operate as a function of a number of all triplets in the cluster of nodes and a number of closed triplets in the cluster of nodes.

10. A method being implemented via execution of computing instructions configured to run on one or more processors and stored at non-transitory computer-readable media, the method comprising:

determining an ordered sequence of a group of keywords by using a probability of association of the group of keywords with a plurality of other keywords, wherein each ordered sequence of the group of keywords is linked to a number of respective interactions over a rolling predetermined time period, and wherein each of the respective interactions that exceeds a maximum age is deleted from a database;

determining a respective interaction metric for the ordered sequence of the group of keywords during the rolling predetermined time period;

constructing, using each respective interaction metric, as determined, a graph comprising a plurality of nodes connected by at least one edge, wherein each respective node of the plurality of nodes represents at least one respective keyword of the group of keywords;

identifying one or more clusters of nodes using the graph;

optimizing each cluster of nodes of the one or more clusters of nodes;

training a predictive algorithm on the one or more clusters of nodes, as identified and optimized; and facilitating altering a graphical user interface (GUI) of an electronic device using the predictive algorithm, as trained.

11. The method of claim 10, wherein:

determining the respective interaction metric comprises using a first set of rules that operate as a function of an expression comprising at least one square root and at least one fraction, wherein the at least one square root is in a numerator or a denominator of the fraction; and determining the respective interaction metric over a specified time period.

12. The method of claim 10, wherein:

determining the ordered sequence of the group of keywords comprises using a probability of association with an amount of revenue or profit generated by a keyword sequence, wherein the keyword sequence comprises the ordered sequence of the group of keywords;

determining the respective interaction metric comprises determining the respective interaction metric between two keyword sequences;

each respective edge of the at least one edge:
 connects a respective pair of nodes; and
 represents a respective number of user interactions between the respective pair of nodes connected by the respective edge; and the computing instructions, when executed on the one or more processors, further cause the one or more processors to perform an operation comprising:
 harvesting one or more keywords from at least one or more search queries that resulted in one or more interactions with the GUI of the electronic device.

13. The method of claim 10 further comprising:

receiving at least one new keyword the one or more processors; and for each respective new keyword of the at least one new keyword received at the one or more processors:
 when the respective new keyword is similar to respective keyword represented by a respective cluster of nodes of the one or more clusters of nodes, creating an edge between a respective node representing the respective new keyword and a node of the respective cluster of nodes of the one or more clusters of nodes.

14. The method of claim 13, wherein creating the edge between the respective node representing the respective new keyword and the node of the respective cluster of nodes of the one or more clusters of nodes comprises:

vectorizing the respective new keyword of the at least one new keyword and the respective keyword; and using a cosine similarity between the respective new keyword of the at least one new keyword, as vectorized, and the respective keyword, as vectorized, to determine when to create the edge between the respective node representing the respective new keyword and the node of the respective cluster of nodes of the one or more clusters of nodes.

15. The method of claim 10, wherein facilitating altering the GUI of the electronic device using the predictive algorithm, as trained, comprises:

predicting a revenue per click using the predictive algorithm, as trained; and determining a bid on at least one keyword represented by at least one node in the one or more clusters of nodes using the revenue per click, as predicted.

16. The method of claim 10, wherein:

identifying the one or more clusters of nodes further comprises using a union find algorithm on the graph; and each respective node pair connected by a respective edge in the one or more clusters of nodes represents a respective pair of keywords having their respective interaction metric above a predetermined threshold.

17. The method of claim 10, wherein optimizing each cluster of nodes of the one or more clusters of nodes comprises:

determining that a cluster coefficient of a cluster of nodes of the one or more clusters of nodes is below a predetermined threshold; and after determining that the cluster coefficient of the cluster of nodes of the one or more clusters of nodes is below the predetermined threshold, removing at least one edge of the cluster of nodes from the one or more clusters of nodes.

18. The method of claim 17, wherein the cluster coefficient of the cluster of nodes is determined using a set of cluster rules that operate as a function of a number of all triplets in the cluster of nodes and a number of closed triplets in the cluster of nodes.

19. The system of claim 1, wherein the ordered sequence of the group of keywords and at least one keyword of a plurality of keywords share one or more identical keywords.

20. The method of claim 10, wherein the ordered sequence of the group of keywords and at least one keyword of a plurality of keywords share one or more identical keywords.

* * * * *